United States Patent Office 2,927,929
Patented Mar. 8, 1960

2,927,929

1,2-DIPHENYL-4(ALPHA-ACETOXYACETYL)-3,5-DIOXOPYRAZOLIDINE

Rolf Denss and Franz Häfliger, Basel, Switzerland, assignors, by mesne assignments, to Geigy Chemical Corporation, New York, N.Y., a corporation of Delaware No Drawing. Original application December 12, 1955, Serial No. 552,290. Divided and this application June 26, 1959, Serial No. 823,001

Claims priority, application Switzerland December 16, 1954

1 Claim. (Cl. 260—310)

The present invention concerns 1,2-diphenyl-4-(alpha-acetoxyacetyl)-3,5-dioxo-pyrazolidine which can be used therapeutically.

1,2 - diphenyl-3,5-dioxo-4-n-butyl-pyrazolidine has already attained great therapeutical importance as a preparation for the treatment of rheumatic complaints. However, 1,2 - diphenyl-4-(alpha-acetoxyacetyl)-3,5-dioxopyrazolidine has not been known up to now.

Surprisingly it has now been found that 1,2-diphenyl-4-(alpha-acetoxyacetyl)-3,5-dioxo - pyrazolidine or the tautomeric form thereof can be produced in a simple manner by reacting acetoxyacetyl chloride with malonyl hydrazobenzene (=1,2-diphenyl-3,5-dioxo-pyrazolidine) in the presence of pyridine or another tertiary organic base.

The compound produced according to the present invention has valuable therapeutical properties, in particular antiphlogistic and antipyretic activity. It is a colorless crystallized compound and forms salts, some of which are difficultly soluble, with inorganic and organic bases.

This application is a divisional application of our copending application Ser. No. 552,290, filed on December 12, 1955.

The following example serves to illustrate the invention. Parts are given as part by weight and their relationship to parts by volume is as that of grammes to cubic centimetres. The temperatures are in degree centigrade.

Example 13.7 parts of acetoxyacetyl chloride dissolved in 15 parts by volume of benzene are added dropwise while stirring to 25.2 parts of malonyl hydrazobenzene suspended in 200 parts by volume of benzene and 35 parts by volume of pyridine and the whole is stirred at room temperature for about 14 hours. The reaction mixture is then filtered and the precipitate, which consists of a pyridine compound of 1,2-diphenyl-4-(alpha-acetoxyacetyl)-3,5-dioxopyrazolidine is purified by recrystallization from alcohol. The crystallized compond melts at 164–172° on decomposition. The free 1,2-diphenyl-4-(alpha-acetoxyacetyl)-3,5-dioxo-pyrazolidine can be obtained therefrom by stirring and decomposing with 2 N-hydrochloric acid with the addition of 10% alcohol. It melts at 117–118°.

What we claim is:

1,2 - diphenyl - 4 - (alpha - acetoxyacetyl) - 3,5 - dioxopyrazolidine.

No references cited.